United States Patent [19]
Georgiou et al.

[11] Patent Number: 4,879,551
[45] Date of Patent: Nov. 7, 1989

[54] SWITCHING ARRAY WITH CONCURRENT MARKING CAPABILITY

[75] Inventors: Christos J. Georgiou, White Plains; Yeong-Chang L. Lien, Briarcliff Manor; Kiyoshi Maruyama, Chappaqua, all of N.Y.

[73] Assignee: International Business Machines Corporation, Armonk, N.Y.

[21] Appl. No.: 727,468

[22] Filed: Apr. 26, 1985

[51] Int. Cl.$^4$ ............................................. H04Q 1/00
[52] U.S. Cl. .......................... 340/825.870; 307/465; 340/825.83
[58] Field of Search ...................... 340/825.85–825.91, 340/825.83, 780, 750; 307/465–469

[56] References Cited
U.S. PATENT DOCUMENTS
| | | | |
|---|---|---|---|
| 2,707,591 | 5/1955 | May | 340/825.87 |
| 4,068,215 | 6/1978 | Mukaemachi et al. | 340/825.87 |

*Primary Examiner*—Ulysses Weldon
*Attorney, Agent, or Firm*—Sughrue, Mion, Zinn, Macpeak & Seas

[57] ABSTRACT

A cross-point switching array in which each cross-point of the array is controlled by the output of a first memory. Each first memory is associated with a second memory. The second memories can be sequentially set by a single controller while the cross-point connections are maintained according to the first memories. The contents of all second memories are concurrently loaded into the associated first memories to simultaneously reconfigure the cross-point array.

7 Claims, 3 Drawing Sheets

SWITCHING ARRAY WITH CONCURRENT MARKING CAPABILITY

DESCRIPTION

1. Technical Field

The invention relates generally to cross-point arrays. In particular, the invention relates to the concurrent marking of the cross-points.

2. Background Art

Switching arrays or cross-point switches have long been used in the telephone industry for the switching of voice lines. More recently, crosspoint switches have found increasing use in computer systems for the selective connection of data lines from one device to another. A simple cross-point switch array 10, as shown in FIG. 1, selectively connects any one of four input lines 12 to any of four output lines 14. .he cross-point switch array 10 of FIG. 1 is called a two-sided switch because the input lines 12 have a different characteristic than the output lines 14, namely the directionality of data flow, and are located on two different sides of the cross-point switch array 10. At each intersection of an input line 12 and an output line 14 there is a cross-point 16 consisting of a switch 18 connected to those two input and output lines 12 and 14. In the illustrated switch 18, the conductivity of the switch 18 and hence the state of the cross-point 16 is determined by a control input 20. Thus the selection of the connection between the input line 12 and the output line 14 is determined by the signals on all the control inputs 20 of the cross-point array 10. The advantage of the cross-point array 10 is that the interconnections between the input lines 12 and the output lines 14 can be independently controlled. Any connection is possible. In many applications, a given input line 12 is only connected to one output line 14 at any given time. In this application, the cross-point array 10 has a data bandwidth that is the product of the bandwidth either of the lines 12 and 14 or of the cross-point 16 multiplied by the number of input lines 12 or of output lines 14. That is, each of the input lines 12 can simultaneously use the cross-point array 10 as long as the intended output line 14 is available. In another mode of operation, a single input line 12 can be simultaneously connected to more than one output line 14. This is called the broadcast mode.

Various types of cross-point switch arrays are well known in the art. In older telephone systems, the individual switches 18 were mechanical relays. More modern cross-point switches use semiconductor integrated circuits for the entire cross-point switch array 10 with the individual switches 18 being MOS transistors, the gate inputs of which are controlled by the control inputs 20. By the use of integrated circuits, the design and fabrication of the cross-point array itself has become relatively easy and inexpensive. As a further result, the size of cross-point array 10 has been greatly increased. A design for a cross-point array 10 with 1024 input lines 12 and the same number of output lines 14 now seems reasonable. However, in such a cross-point switch, the number of switches 18 reaches 1,048,576. The switches 18 are relatively simple to build but the control of such a large number of cross-points 16 presents some difficult problems. one of the difficulties is that the control of so many cross-points can impose an effective data rate limitation for the cross-point array 10. Before data can be transmitted through the crosspoint switch, the controller must set the appropriate cross-point 16. A single controller can only process one connection request at a time, such as in the system disclosed by Begeman et al in U.S. Pat. No. 4,345,251. Georgiou, one of the present inventors, has described the use of multiple controllers in U.S. patent application Ser. No. 544,653, filed Oct. 24, 1983 Pat. No. 4,630,045, incorporated herein by reference. Although the design disclosed therein is effective at increasing the speed of the cross-point controller, nonetheless, any controller takes time to respond to a request for connection. If the input line is waiting for the connection to be made in order to transmit data, then the effective data rate of the switch is reduced. This delay becomes a particular problem when the transmitted messages are relatively short so that a large number of connections need to be made.

SUMMARY OF THE INVENTION

Accordingly, it is an object of this invention to provide for the control of the cross-points of a cross-point array that does not interrupt the data flow.

Another object of this invention is to provide a high bandwidth cross-point switch.

The invention can be summarized as a cross-point switch array in which the switch at each crosspoint is controlled by a first latch. Associated with each first latch is a second latch, the state of which is determined by the cross-point controller. The contents of all second latches are concurrently transferred to the associated first latches by a single control line. Thus, the second latches can be set up for the next transmission cycle by the controller while data is continuing to flow through the cross-point switch, as determined by the first latch. The concurrent signal marks the end of a prior transmission period and the beginning of the next transmission period.

DETAILED DESCRIPTION OF THE PREFERRED EMBODIMENTS

Figure 1:
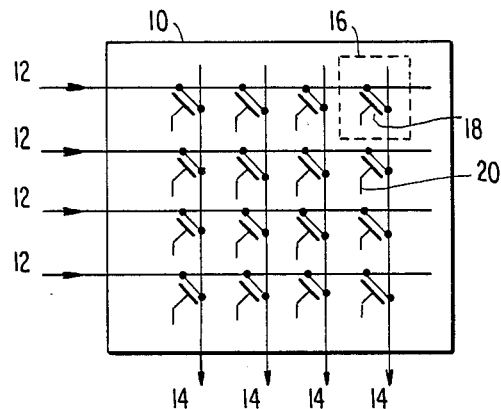
FIG. 1 is an illustration of a well-known cross-point switch array.
Figure 2:
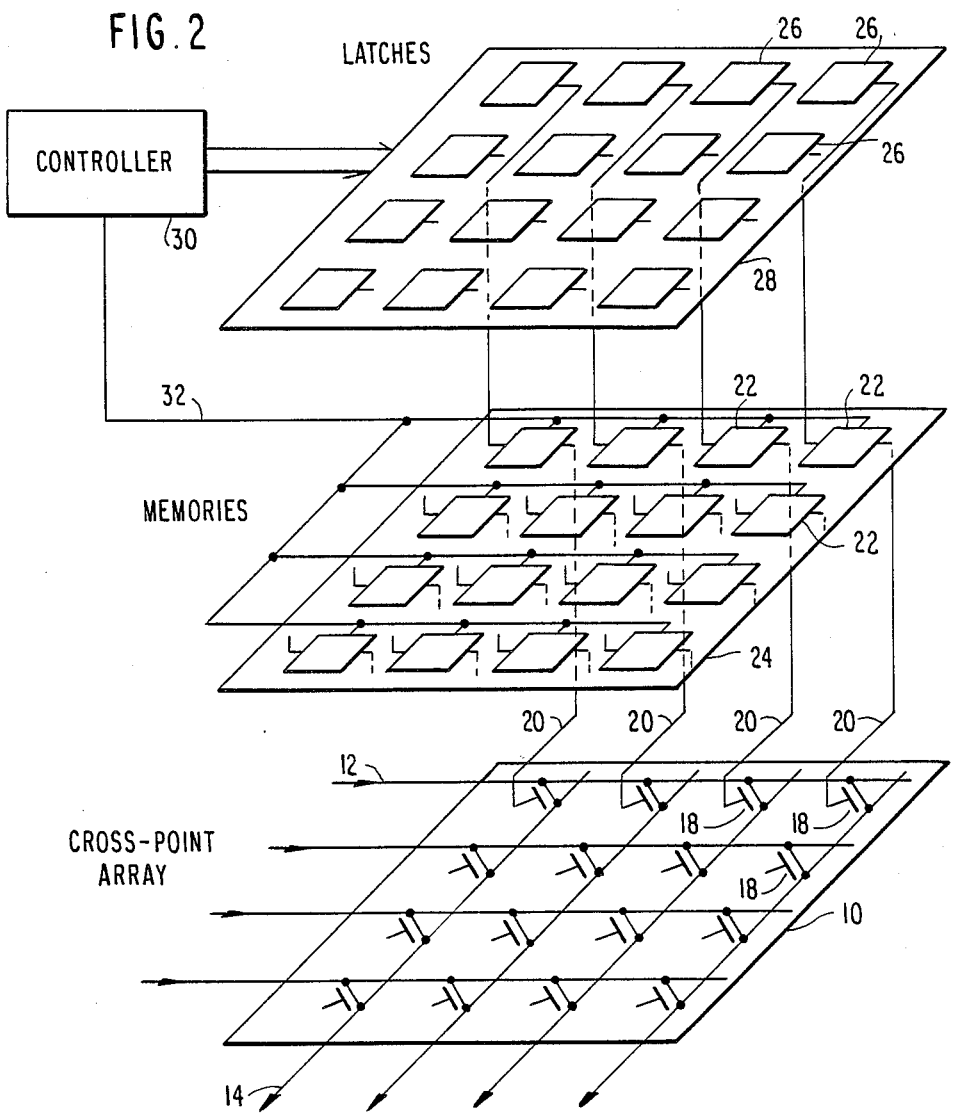
FIG. 2 is an illustration of the organization of the cross-point switch system of the present invention.

The invention can be visualized, as shown in FIG. 2, as an array of memory control elements in parallel with the usual cross-point switch array. The switching plane is the cross-point array 10, of the type previously described. The individual control lines for all the individual switches 18 are connected to respective memory elements 22 arranged in another middle plane 24. The memory elements 22 store a '1' when the switch 18 that it controls is conducting or store a '0' when the controlled switch 18 is non-conducting. Each of the memory elements 22 will keep the associated switch 18 turned on for the duration of a data transmission period. Makaemuchi et al in U.S. Pat. No. 4,068,215 discloses separate latches controlling every cross-point in an array. Wahlstrom in U.S. Pat. No. 3,473,160 discloses a shift register controlling the separate elements in a cellular logic array.

The memory elements 22 are set to values indicated by associated latches 26 in another upper plane 28. The values contained in these latches 26 are individually controlled by a controller 30. In the preferred embodiment, the controller 30 sets the latches 26 one by one. Several or all of the latches 26 can be set to new values by the controller 30 before the controller 30 activates a memory latch control line 32 connected to all the memory elements 22. The activation of the memory latch control line 32 causes the contents of all the latches 26 to be concurrently transferred to the associated memory elements 22.

By the use of the structure illustrated in FIG. 2, the controller 30 can be setting the latches 26 for the configuration of the cross-point switch 10 in the next period of data transmission while data continues to be transmitted over the cross-point array 10 in the current transmission period according to the current states of the memory elements 22. A single signal on the memory latch control line 32 produces the required reconfiguration of the cross-point array 10.

Magos in U.S. Pat. No. 4,134,132 discloses a two-dimensional multi-shade video display in which each point of the two-dimensional raster has an analog storage element. The video signal is deserialized into a one-dimensional array of analog storage elements. The contents of the one-dimensional array are supplied in parallel to the storage elements in a selected row of the two-dimensional raster.

The multi-plane structure of FIG. 2, although conceptually simple, is difficult to implement in semiconductor technology and also neglects much important detail in a switching system.

Figure 3:
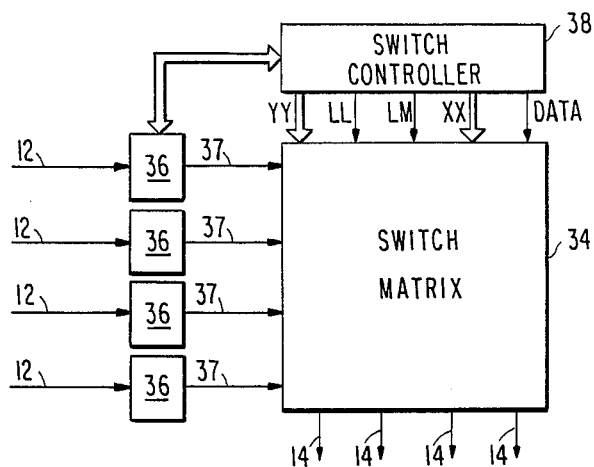
FIG. 3 is another and more realistic representation of the cross-point switch system of the present invention.

A more realistic structure is shown in FIG. 3. Each of the input lines 12 are connected to a switch matrix 34 through a switch adaptor 36. The switch adaptors 36 are used to separate control information from data in the signal train received on the input lines 12. The data is routed through the switch matrix 34 while the control information is sent to a switch controller 38.

The switch controller 38 controls the switch matrix 34 by five sets of signals. The multi-bit XX and YY signals are addresses for the desired cross-point in the switch matrix 34. For instance, the XX address could be the numerical designation of the input line 12 associated with the cross-point while the YY address could be the numerical designation of the associated output line 14. The remaining signals are the data signal DATA, the load latch signal LL and the load mark signal LM, to be described later.

Figure 4:
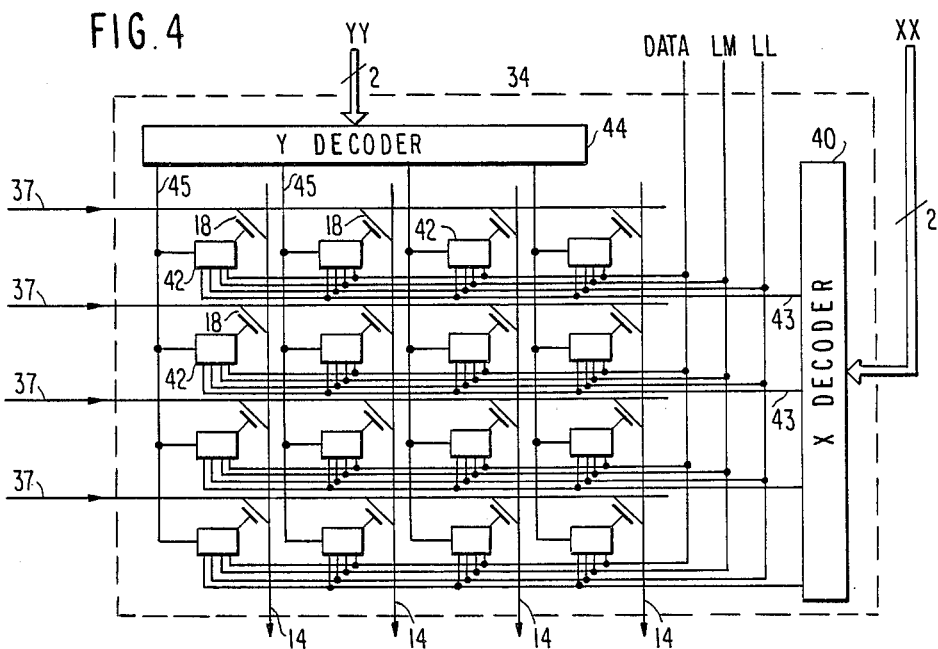
FIG. 4 is an illustration of the switch matrix of the system of FIG. 3.

Further details of the switching matrix are shown in FIG. 4. An decoder 40 receives the XX address and, based upon its value, selects one of four rows in, an array of control elements 42 by an active X signal on a respective row line 43. Similarly, a Y decoder 44 receives the YY address and selects one of four columns in the array of control elements 42 by an active Y signal on a respective column line 45. The data signal DATA, the load latch signal LL and the load mark signal LM are identically connected to all the control elements 42.

Figures 5, 6:
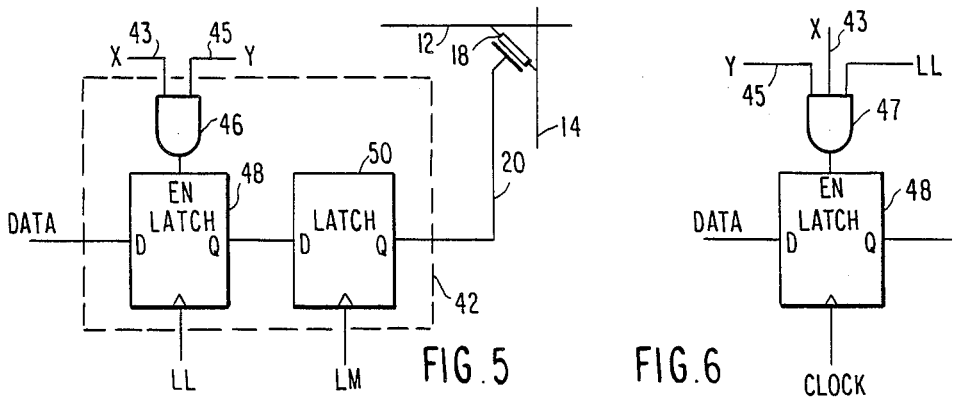
FIG. 5 is an illustration of the control element of the switch matrix of FIG. 4.
FIG. 6 is a connection diagram of the first latch for an alternative clocked embodiment of the invention.

The control element 42 is shown in more detail in FIG. 5. The X and Y signals on the row line 43 from the X decoder 40 and on the column line 45 from the Y decoder 44, respectively, depending on in which row and column of the array the control element 42 is located, are used as inputs to an AND gate 46. Thus, only when the XX and the YY signals indicate that this particular control element 42 is selected, resulting in high X and Y signals, does the output of the AND gate 46 assume a high value. The AND gate output is used as an enable input EN into a first latch 48. The data input D of the first latch 48 is connected to the data signal DATA. The load latch signal LL is connected to the clock input of the first latch 48. Whenever the output of the AND gate 46 is high, indicating that this control element 42 is being addressed, the value of the data signal DATA is latched into the first latch 48 on the upward transition of the load latch signal LL.

In order to load a setting into the first latch 48, the controller 38 sets the data signal DATA to the desired value and sets the XX and YY address signals that selects the particular control element 42 by high X and Y signals. Then the load latch signal LL clocks in the data signal DATA only into the selected control element 42.

The output Q of the first latch 48 is connected to the data input D of a second latch 50. The latch control or clock input of the second latch 50 is controlled by the load mark signal LM. Whenever the load mark signal LM transitions high, the value in the first latch 48 is latched into the second latch 50. There is no address selection for the latching of the second latch 50 so that all control elements 42 simultaneously undergo this same latching although for the different values held in the respective first latches 48. The output Q of the second latch is connected to the control input 20 of the individual switch 18 that is associated with that particular control element 42. Thus the value in the second latch 50 controls whether the individual switch 18 is conducting or non-conducting, that is, whether the cross-point 16 is connected or disconnected. The first latch 48 corresponds to the latches 26 in the upper plane 28, shown in FIG. 2, while the second latch 50 corresponds to the memories 22 in the middle plane 24.

The control element 42 in FIG. 5 is for an unclocked system that relies upon the load latch signal LL for the exact latching time. A clocked configuration for the first latch 48 is shown in FIG. 6 in which a system clock CLOCK is connected to the clock input of the first latch 48. The output of an AND gate 47 receiving the X and Y signals and the load latch signal LL, is connected to the enable input EN of the first latch 48. Prior to the upward transition of the clock signal CLOCK, the load latch signal LL is set and the X and Y signals select the particular first latch 48. Then when the clock signal CLOCK makes its upward transition, the data signal DATA is latched into the first latch 48. A similar configuration can be used for the second latch 50 with the clock signal CLOCK connected to the clock input and the load mark signal LM connected to the enable input.

Figure 7:
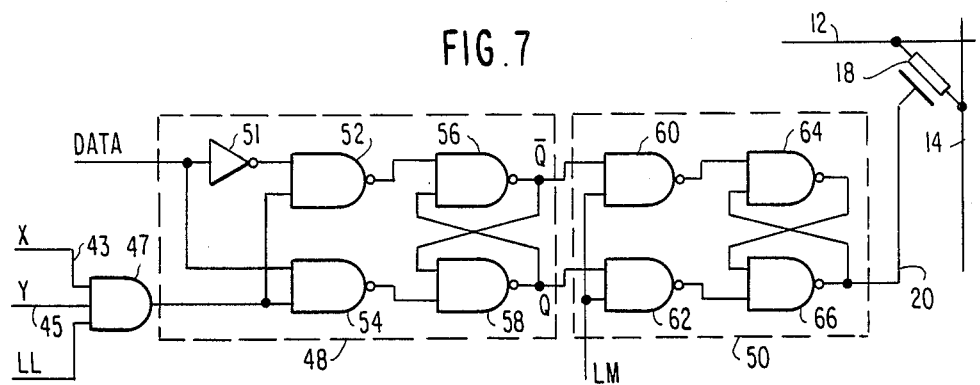
FIG. 7 is a logic gate representation for another embodiment of the control element.

A logic gate level implementation of the first and second latches 48 and 50 is shown in FIG. 7 that corresponds to the unclocked control element 42 of FIG. 5. The inputs and outputs remain the same. An inverter 51 provides a complementary version of the data signal DATA. Two NAND gates 52 and 54 combine, the select signal from the AND gate 46 with the true and complemented versions respectively of the data signal DATA. The outputs of the NAND gates 52 and 54 are fed respectively to two more NAND gates 56 and 58 connected in a cross-coupled configuration. Whenever the AND gate 47 is selected by the X and Y signals and enabled by the load latch signal LL, the cross-coupled NAND gates 56 and 58 are latched to the value of the data signal DATA. The outputs −Q and Q of these two cross-coupled NAND gates 56 and 58 are the outputs of the first latch 48 and are led to respective NAND gates 60 and 62 in the second latch 50. Both of the NAND gates 60 and 62 also receive the load mark signal LM which acts to gate in the outputs −Q and Q of the first latch 48. The outputs of the NAND gates 60 and 62 are led to two more cross-coupled NAND gates 64 and 66, acting as a latch. The output of the NAND gate 66, corresponding to the true output Q of the first latch 48, is connected to the control line 20 controlling the individual switch 18.

Figure 8:
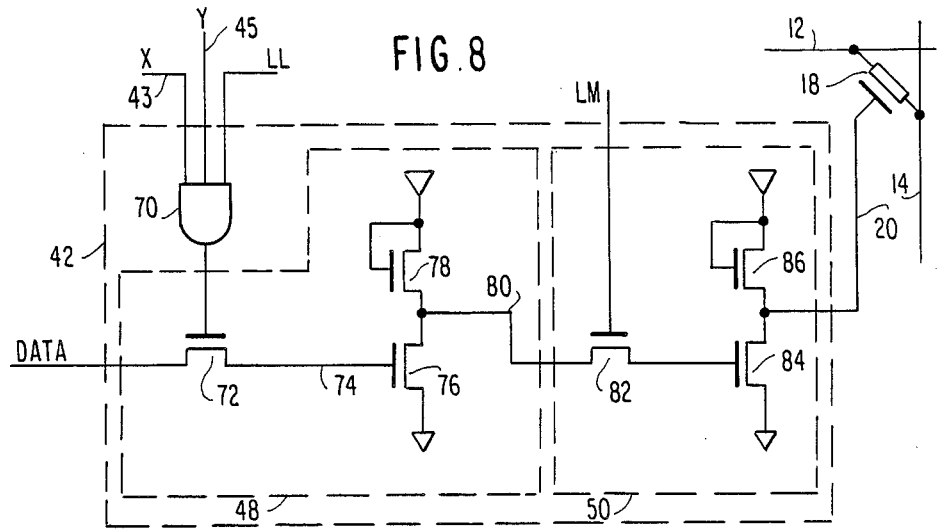
FIG. 8 is a transistor representation for an alternative dynamic embodiment of the control element.
Figure 9:
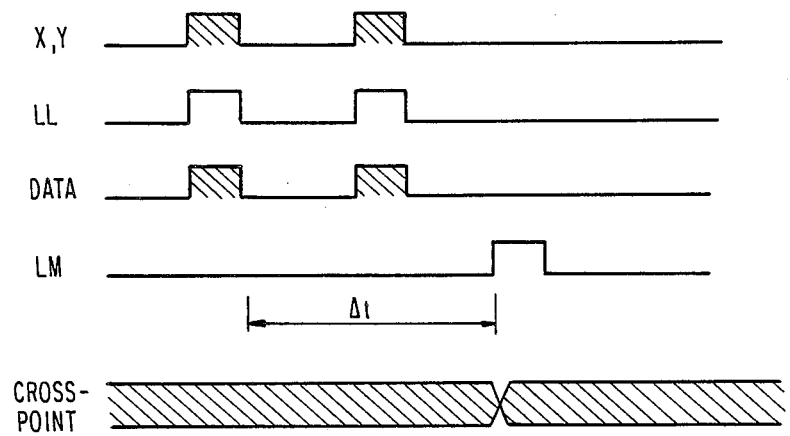
FIG. 9 is a timing diagram for the embodiment of FIG. 2.

Yet another implementation for the control element 42 is shown at the transistor level at FIG. 8. This is a dynamic system requiring coordination of the control signals, as shown in the timing diagram of FIG. 9. If the represented control element 42 is selected by the XX and YY address signals, the high load latch signal LL causes an AND gate 70 receiving the X, Y and LL signals to go high, thus rendering conductive a transistor 72. The conductive transistor 72 then passes the data signal DATA to an internal line 74 controlling the gate of a first latch transistor 76. A first load transistor 78 is connected in series with the first latch transistor 78 between the power supply and ground. A high signal on the internal line 74 produces a low signal on a first latch output line 80 connected between the first latch transistor 76 and the first load transistor 78. Similarly, a low signal on the internal line 74 produces a high signal on the first latch output line 80. The internal line 74 and the gate of the first latch transistor 76 have a substantial capacitance. Therefore, this capacitance will hold whatever data signal DATA has been impressed thereupon even after the load latch transistor 72 has been turned off. Nonetheless, this capacitance is leaky and cannot be used for a storage time longer than a time Δt. In a similar manner, several first latches 48 can be loaded with different data signals DATA by the sequencing of the address signals XX and YY within the maximum time Δt.

Subsequently, the load mark signal LM is applied to the gate of a load mark transistor 82 that then passes the signal latched on the first latch output line 80 to a second latch transistor 84 and a second load transistor 86, similar to the first latch and load transistors 76 and 78. The control input 20 of the cross-point switch 18 is connected between the second latch transistor 2 and the second load transistor 86 and carries a signal CROSS-POINT. The upward transition of the load mark signal LM marks all cross-points concurrently and the marking is maintained even after the removal of the load mark signal LM. However, because of the dynamic nature of the second latch 50, no more than the maximum storage time Δt should pass between successive markings of all cross-points.

It is believed that the invention is particularly useful in the situation in which occasionally one device broadcasts short messages to several other devices. The regular data flow can continue through the cross-point array while the controller is setting up the future connections for the broadcast. Then, upon issuance of the load mark signal LM, all the required connections are immediately made. Thus the regular data flow is not interrupted by the necessity to set multiple cross-points for the broadcast.

Having thus described our invention, what we claim as new, and desire to secure by Letters Patent is:

1. A cross-point switching array system, comprising:
    an array of cross-points for selectively connecting each of a plurality of first lines to any of a plurality of second lines;
    an array of controlling means, each controlling means controlling a connection across one of said cross-points, each said controlling means comprising:
    first memory means for storing a present connection value, the output of said first memory means presently determining said connection; and
    second memory means associated with said first memory means, for storing a future connection value; and
    said system further comprising:
    means for concurrently transferring said future connection value from each said second memory means to the associated first memory means wherein said transferred future connection value becomes said present connection value.

2. A system as recited in claim 1, wherein said means for concurrently transferring comprises:
    addressing means for selecting one of said controlling means;
    connection value setting means equivalently connected to all said controlling means for providing said future connection value; and
    wherein said said controlling means, upon being selected by said addressing means, stores said provided future connection value into the second memory means of said each controlling means.

3. A system as recited in claim 1, wherein each said second memory means includes a loading control input and a data output connected to a data input of the associated first memory means wherein said concurrent transferring means provides one loading signal to all said loading control inputs.

4. A system as recited in claim 2, wherein said addressing means includes means for sequentially addressing a plurality of said controlling means.

5. A system as recited in claim 2, wherein said addressing means includes first addressing means for addressing all controlling means controlling a connection to a selected one of said first lines and second addressing means for addressing all controlling means controlling a connection to a selected one of said second lines and wherein each said controlling means includes means for combining an output of said first addressing means with an output of said second addressing means.

6. A method of controlling an array of cross-points, comprising the steps of:
    selectively connecting each of a plurality of first lines to any of a plurality of second lines with said array of cross-points;
    controlling a connection across each of said cross-points by storing a present connection value in a first memory means, an output of said first memory means presently determining said connection, and storing a future connection value in a second memory means associated with said first memory means; and
    concurrently transferring said future connection value from each said second memory means to the associate first memory means wherein said transferring future connection value becomes said present connection value.

7. A method, as recited in claim 6 further comprising the step of
    maintaining the connections of said cross-points while sequentially setting said future connection values until said concurrent transferring.

* * * * *